T. E. MURRAY, Jr., AND J. B. MURRAY.
METHOD OF ELECTRICALLY WELDING METAL BODIES.
APPLICATION FILED NOV. 25, 1919.

1,339,967.

Patented May 11, 1920.

Inventors
Thomas E. Murray Jr
Joseph B. Murray
By Paul Benjamin
their Attorney

UNITED STATES PATENT OFFICE.

THOMAS E. MURRAY, JR., AND JOSEPH B. MURRAY, OF BROOKLYN, NEW YORK.

METHOD OF ELECTRICALLY WELDING METAL BODIES.

1,339,967.   Specification of Letters Patent.   Patented May 11, 1920.

Application filed November 25, 1919. Serial No. 340,608.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Methods of Electrically Welding Metal Bodies, of which the following is a specification.

Metal bodies to be welded electrically frequently have on their contacting surfaces small asperities, projections or the like which, when the bodies are brought together, furnish paths for the welding current of very much less area than that of said surfaces. Where high power currents of very short duration especially are used, great heat is generated as these asperities come together, whereby the metal is fused or even vaporized, so that a uniform weld over the desired area may not be obtained. Hitherto, and especially in the manufacture of thin metal shells of two half sections, we have removed these asperities by grinding or cutting, which brings into the manufacture a separate operation involving time and expense. We have found that we can eliminate this difficulty without the need of any such grinding or cutting by the process hereinafter set forth.

In the accompanying drawing—

Figure 1:
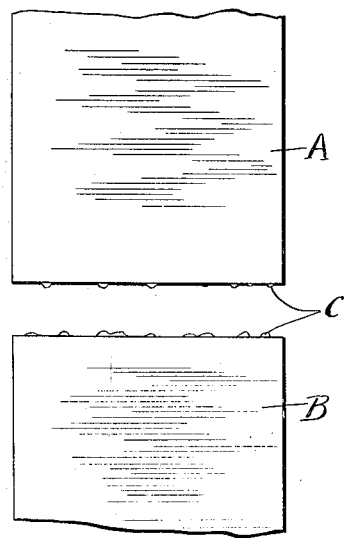
Figure 2:
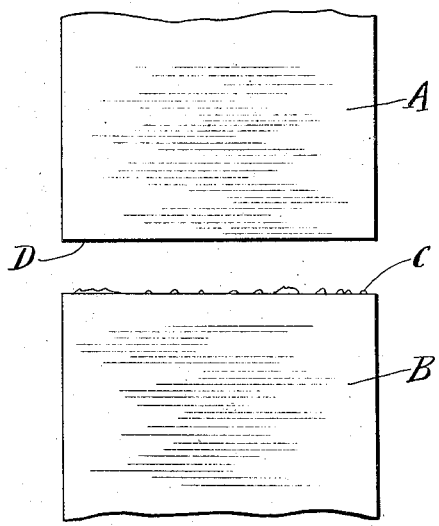
Figure 3:
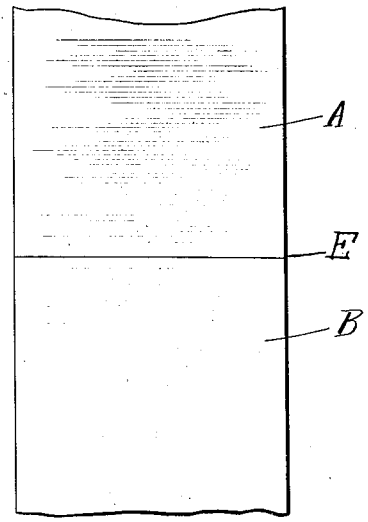

Figure 1 shows two plates disposed edge to edge, the edge surfaces having asperities or small projections. Fig. 2 shows two similar plates disposed in like manner, the asperities or projections being only on one of said plates, the contact edge of the opposite plate being flat and true. Fig. 3 shows the two plates of Fig. 1 or Fig. 2 after welding.

Similar letters of reference indicate like parts.

A and B are metal plates to be welded, said plates having on their contacting surfaces small projections or asperities more or less irregularly distributed, as illustrated at C. In Fig. 1 these asperities are on the opposing surfaces of both plates. In Fig. 2 they are only on the lower plate B, the upper plate A having its edge surface D flat and true.

Before the welding current is established, we press the plates A, B together, using a mechanical force sufficient to flatten out and eliminate said asperities, and so secure contact over the whole or a very large proportion of the opposing surface areas. This done, we establish the current and make the weld, as shown at E, Fig. 3.

Practically all that is required is to operate and arrange the welding machine used so that the pressure exerted thereby at the joint will be sufficient to eliminate the asperities—a matter easily determined once for all with any particular kind of material. We thus save all need of filing, grinding, cutting or swaging the joint surfaces, and can take the work directly from the stamping dies—when the same are employed to give it a desired shape—to the welding machine, thus saving all the time and expense of this intermediate operation.

We claim:

1. The method of electrically welding metal bodies having on their welding surfaces small projections or asperities, which consists in first pressing said surfaces together with sufficient force to eliminate said asperities, and then establishing the welding current to unite said surfaces.

2. The method of electrically welding metal bodies, one of said bodies having a substantially smooth welding surface and the other having small projections or asperities on its welding surface, which consists in first pressing said surfaces together with sufficient force to eliminate said asperities, and then establishing the welding current to unite said surfaces.

In testimony whereof we have affixed our signatures in presence of two witnesses.

THOMAS E. MURRAY, JR.
JOSEPH B. MURRAY.

Witnesses:
GERTRUDE T. PORTER,
MAY T. McGARRY.